United States Patent [19]

Braun et al.

[11] Patent Number: 4,657,615
[45] Date of Patent: Apr. 14, 1987

[54] COMPOSITE LEADING EDGE/SPAR MEMBER FOR AN AIRCRAFT CONTROL SURFACE

[75] Inventors: Rudolf Braun; Richard Jensen, both of Winnipeg, Canada

[73] Assignee: The Boeing Company, Seattle, Wash.

[21] Appl. No.: 642,572

[22] Filed: Aug. 20, 1984

[51] Int. Cl.$^4$ .......................................... B61H 81/00
[52] U.S. Cl. .................... 156/245; 156/173; 156/189; 156/191; 156/285; 416/226
[58] Field of Search ............... 156/285, 287, 189, 185, 156/173, 175, 245; 244/123; 416/226, 230

[56] References Cited

U.S. PATENT DOCUMENTS

| | | | |
|---|---|---|---|
| 2,954,828 | 10/1960 | Marchetti | 156/185 X |
| 3,073,268 | 1/1963 | Cole | 156/285 X |
| 3,217,807 | 11/1965 | Underhill et al. | 170/159 |
| 3,372,757 | 3/1968 | Krohncke | 170/159 |
| 3,962,506 | 6/1976 | Dunahoo | 428/158 |
| 4,095,322 | 6/1978 | Scarpati et al. | 29/156.8 |
| 4,169,749 | 10/1979 | Clark | 156/285 X |
| 4,264,278 | 4/1981 | Weingart | 156/189 X |

Primary Examiner—David Simmons
Attorney, Agent, or Firm—Bruce A. Kaser; Delbert J. Barnard

[57] ABSTRACT

This invention relates to an improved composite material leading edge/spar member for an aircraft control surface, and the like. The present invention provides a one-piece composite leading edge/spar member that is of a lighter and stronger construction offering dimensional stability, and an efficient method for manufacturing the same is also provided. A one-piece leading edge/spar member (12) includes a forward leading edge portion (22), and an aft spar portion (23). The forward leading edge and the aft spar portions are connected together as a continuous one-piece tubular member of composite material. The forward leading edge portion (22) may be rounded, and the aft spar portion (23) may include an aft web portion (24) and first and second rebate portions (26, 28). The rebate portions (26, 28) connect the web portion (24) to the rounded forward leading edge portion (22), and provide surfaces for the attachment of skin surface members (16, 18) thereto.

4 Claims, 8 Drawing Figures

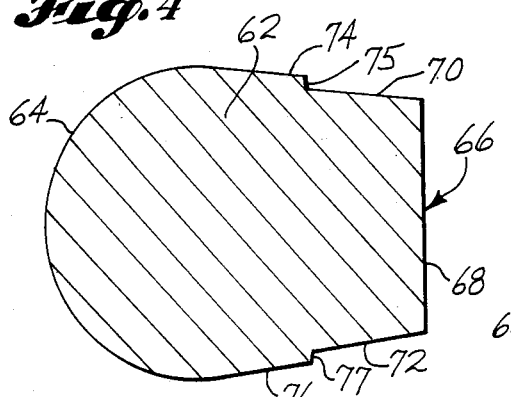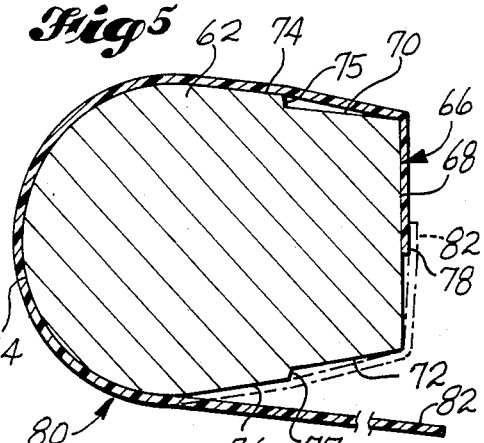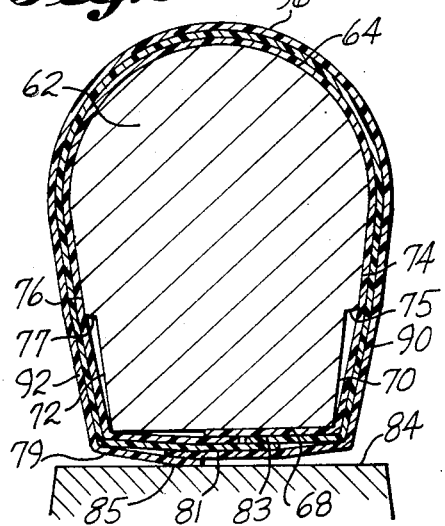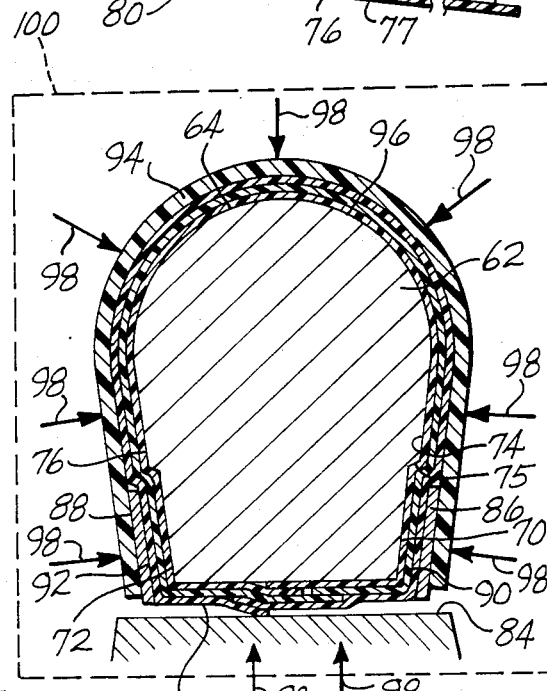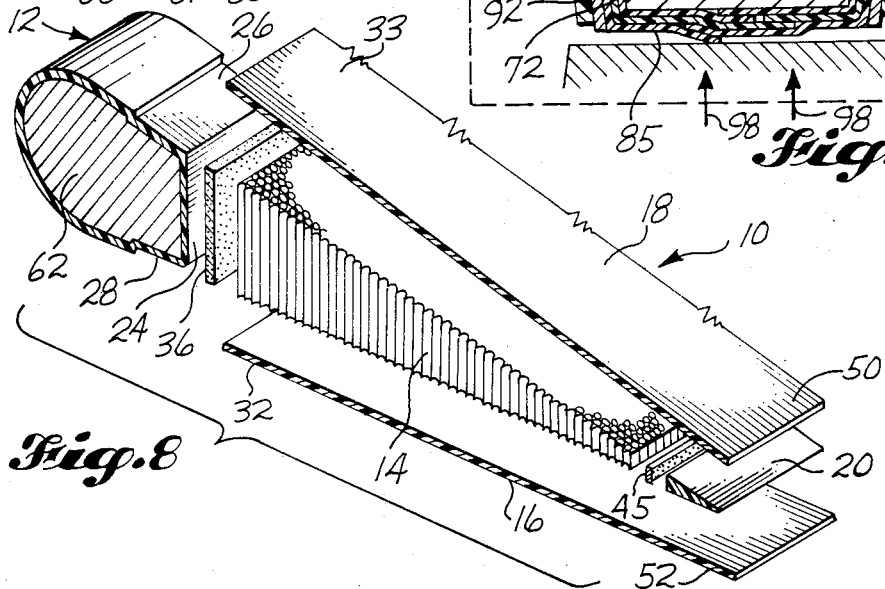

COMPOSITE LEADING EDGE/SPAR MEMBER FOR AN AIRCRAFT CONTROL SURFACE

DESCRIPTION

1. Technical Field

This invention relates to aircraft control surfaces made of composite materials, and more particularly, it relates to a composite leading edge/spar member of an aircraft control surface, wherein such member is of a one-piece tubular construction.

2. Background Art

The use of composite materials to manufacture aircraft control surfaces is well-known. Composite materials are well-suited for this type of use because of their high strength-to-weight ratio. Construction of a composite control surface typically includes first manufacturing a composite spar member, and then attaching a honeycomb structual core, composite skin members, and a composite trailing wedge member to the spar member, followed by manufacturing and attaching a rounded leading edge member to the spar member. Therefore, the generally accepted method of manufacturing a control surface entails the construction of a two-piece leading edge and spar component. That is, the rounded leading edge member and the spar member are each fabricated separately, and then at some time during the assembly of the control surface the rounded leading edge member is connected to the spar member to form a two-piece tubular member, wherein such member makes up a part of the control surface. There are many disadvantages associated with this type of two-piece construction. Such disadvantages, and the advantages of the present invention, will be discussed in subsequent portions of this application.

Prior art United States patent applications which are known to have relevance to the present invention are as follows: U.S. Pat. No. 4,095,322 issued to Scarpati et al on June 20, 1978; U.S. Pat. No. 3,962,506 issued to Dunahoo on June 8, 1976; U.S. Pat. No. 3,372,757 issued to Krohncke on March 12, 1968; and U.S. Pat. No. 3,217,807 issued to Underhill et al on Nov. 16, 1965.

DISCLOSURE OF THE INVENTION

The invention of the present case provides a one-piece composite material leading edge/spar member for an aircraft control surface, and a method of fabricating the same. The leading edge/spar member includes a forward leading edge portion, and an aft spar portion, both of which are made of a composite material. The forward leading edge portion and the spar portion are connected together so as to form a continuous one-piece tubular member. In preferred form, the forward leading edge portion will be rounded. The spar portion will include an aft web portion, and a first and a second rebate portion connecting the web to the forward leading edge portion. A graphite/epoxy material would be a suitable composite material for use in constructing the leading edge/spar member.

To practice the method of the invention, an elongated lay-up mandrel is provided for forming the leading edge/spar member. The mandrel may have the same cross-sectional shape as the member to be formed, and may include a rounded leading edge forming portion and a spar forming portion that has a web forming portion and first and second rebate forming portions. The first and second rebate forming portions connect the web to the rounded leading edge forming portion.

In a preferred mode of practicing the invention, a composite material that is to be molded into the shape of a leading edge/spar member may be applied or wrapped around the mandrel, with the material perimetrically surrounding and covering the rounded leading edge and the spar forming portions of the mandrel. A forming pressure may then be applied to the composite material to shape and mold the material into the same shape as the rounded leading edge and spar forming portions. One way that forming pressure may be applied is to position the wrapped mandrel in abutting relationship adjacent a supporting surface, whereby the web forming portion of the wrapped mandrel directly abuts the surface. Then, a pair of caulplates may be applied to the wrapped rebate forming portions of the mandrel, with one caulplate being applied to each rebate forming portion. Still another caulplate may be applied to the wrapped rounded leading edge forming portion of the mandrel. All of the caulplates, and the supporting surface, should be shaped such that they mold the composite material into the same shape as the mandrel. After the mandrel has been wrapped, placed on the supporting surface, and the caulplates have been applied, then the entire assembly of wrapped mandrel, supporting surface, and caulplates may be suitably vacuum bagged. Pressure may be applied to the outer surface of the bagging and the composite material can then be cured to set and hold the shape of the mandrel, thereby forming the leading edge/spar member.

Applying composite material or wrapping the mandrel may be accomplished by placing a leading end portion of the composite material on the web forming portion of the mandrel. Then, at least one layer of the material should be wrapped around the mandrel. Wrapping may be finished by overlapping the leading end portion of the material with a trailing end portion, whereby the trailing end portion should also be positioned adjacent the web forming portion of the mandrel. The purpose for this is to locate the overlapped end portions of the material in the web portion of the formed leading edge/spar member. Such location is desirable because the web portion of the formed leading edge/spar member will typically not be an exposed airflow surface when it is in use as a structural part of a control surface. This technique may remain substantially the same even if a plurality of layers are used to form the leading edge/spar member. In this latter case, however, the overlaps of a plurality of layers may be staggered for the purpose of strengthening the member across the width of the formed web portion.

It goes without saying that at least one layer of material is required to wrap the mandrel, but more layers may be used. The number of layers of composite material applied or wrapped around the mandrel will depend on the desired thickness of the leading edge/spar member to be formed.

The method of the present invention is advantageous in that it permits the composite material to be filament wound around the mandrel instead of being wrapped on a layer-by-layer basis. Filament winding is a well-known process that would be particularly well suited for mass producing large quantities of leading edge/spar members.

An important part of the curing process includes thermally expanding the mandrel and curing the material while the mandrel remains in the thermally expanded state. For example, the curing process may include placing the above-described vacuum bagged assembly of the wrapped mandrel, caulplates, and supporting surface into an autoclave, and heating the assembly under pressure for a specified time. As an example, the assembly could be held at a temperature of 350° F. and a pressure of 85.0 psi for approximately 1.5 hours. The pressure would cause the bagging to force the caulplates and supporting surface against the composite material. It should be mentioned that a person skilled in the art would realize that a certain amount of pressure would be applied to the material during an evacuation process associated with vacuum bagging the assembly. Obviously the pressure of 85.0 psi would be externally applied to the bagging. The increase in temperature would cause the mandrel to thermally expand further forcing the material against the caulplates. By curing the composite material in this manner, the material sets and holds the shape of the expanded mandrel. Since composite materials are relatively stable from the standpoint of thermal expansion and contraction, the composite material will not contract along with the mandrel when they both cool after removal from the autoclave. What this means is that the mandrel shrinks relative to the newly formed tubular leading edge/spar member, which permits easy removal of the mandrel from the leading edge/spar member. It may be advantageous, however, to keep the mandrel inside the formed leading edge/spar member until assembly of the control surface has been completed. This permits the mandrel to be used as a part of a control surface assembly jig.

After the leading edge/spar member is formed by curing the composite material, the caulplates may be removed, and the mandrel and the newly formed member may be repositioned away from the supporting surface. The remaining components of the control surface may then be attached to the leading edge/spar member. This may include first attaching a leading side of a first skin member to one of the rebate portions of the leading edge/spar member. This attachment should be done in a manner such that the rounded leading edge portion of the leading edge/spar member and the skin surface member form a substantially continuous aerodynamic surface. Then, a wedge-shaped trailing edge member may be attached to a trailing side portion of the first skin surface member. The trailing edge member will be spaced a certain distance from the web portion of the leading edge/spar member so that a generally wedge-shaped honeycomb core member can be positioned in such space. The honeycomb core member provides control surface stiffening support and therefore defines the structural core of the control surface. A forward end surface of the honeycomb member may be connected to the web portion of the leading edge/spar member, and an aft end surface of the honeycomb member may be connected to the wedge-shaped trailing edge member. The honeycomb member should, of course, be attached to the skin surface member as well. After the honeycomb member is thus attached, a second skin surface member may be attached to the other rebate portion of the leading edge/spar member, and to the honeycomb member and the trailing edge member, with the mode of attachment being substantially the same as that which was described above. The control surface is then in an assembled form, and caulplates may be applied to each of the outer surfaces of the skin members for curing the control surface. Curing the control surface may also involve a vacuum bagging and curing process which is well-known. After the control surface is cured, the mandrel may then be removed from the leading edge/spar member. The control surface is then ready for machining at aft inboard and outboard edges, and for the assembly of hardware components thereto.

An advantage of the above-described method is that it provides a composite leading edge/spar member that is constructed as a one-piece unit. Having such a one-piece construction provides both a lighter and a stronger leading edge/spar member. The past generally accepted method of fabricating such a member was to build it as two separate pieces, i.e., manufacture a rounded leading edge piece, and then a spar piece, and then connect the two pieces together with fasteners and/or adhesive bonding processes. A one-piece member in accordance with the present invention is lighter in weight since it eliminates extra weight associated with fastening two separate pieces together. A one-piece member is also stronger since there is a continuous structural joinder between the rounded leading edge and the spar portions of the member.

A one-piece leading edge/spar member provides still another advantage from the standpoint that it is more efficient to manufacture in terms of saving time, labor, and material costs. It goes without saying that a one-piece fabrication method is inherently faster than a two-piece fabrication method since the step of connecting two pieces together is eliminated. Furthermore, eliminating the two-piece method may also result in a significant reduction in waste material. Formerly, in the two-piece method, a certain amount of trimming of each piece was required before they could be assembled together. The trimmed material became waste. Such trimming is totally eliminated by the method of the present case.

Eliminating a two-piece fabricating method also reduces tooling costs. For example, the number of lay-up mandrels may be reduced from two to one since the leading edge/spar member is not manufactured in two pieces. In addition, the single lay-up mandrel of the present method may be used as part of a bond assembly jig to fabricate the entire control surface once the leading edge/spar member has been formed.

Another advantage associated with eliminating a two-piece fabrication method is that certain kinds of assembly warpage associated with connecting two composite components together are eliminated. This kind of warpage results from what is commonly called component "spring-back", a phenomenon that can often occur during the molding of composite components. Spring-back is something that would be familiar to a person skilled in the art. To explain this phenomenon by way of providing an example, molding a composite material into a 90° angle may typically involve molding it adjacent a forming mandrel having a portion that provides a surface with a 90° bend. Although the material is molded into the same shape as the mandrel, after it is removed from the mandrel it tends to "spring-back" to an angle somewhat greater than 90°. Spring-back is a problem associated with the previously described two-piece fabrication method since the spar piece and the rounded leading edge piece are each fabricated separately as open ended components, which means that a certain amount of spring-back may occur in each piece. Spring-back is eliminated by the method of the present invention since the composite leading edge/spar member is constructed as a continuous one-piece tubular unit.

The above-stated advantages should become more fully apparent to the reader upon reading the description that follows herein in conjunction with the drawings.

BRIEF DESCRIPTION OF THE DRAWINGS

In the drawings, like reference numerals refer to like parts throughout, and wherein:

FIG. 4 is a sectional view of a mandrel that may be used for manufacturing the leading edge/spar member shown in FIGS. 1 and 2;

FIG. 5 is a view of the same mandrel shown in FIG. 4, but shows the method by which a composite material is wrapped around the mandrel to form a leading edge/spar member like the member of FIGS. 1 and 2;

FIG. 6 is a view of the mandrel of FIGS. 4 and 5, but shows the mandrel wrapped with composite material and positioned on a surface, with the surface also being shown in section;

FIG. 7 is a view of the mandrel of FIG. 6, but shows the application of caulplates to the wrapped portions of the mandrel, and schematically illustrates the vacuum bagging and curing of the composite material by placing the wrapped mandrel and caulplates into an autoclave, with the bagging not being shown in the drawing;

FIG. 8 is an exploded fragmentory pictorial view of the control surface shown in FIG. 1, but shows a sectional view of the mandrel while it is still positioned within the leading edge/spar member after such member has been fabricated.

BEST MODE FOR CARRYING OUT THE INVENTION

Figure 1:
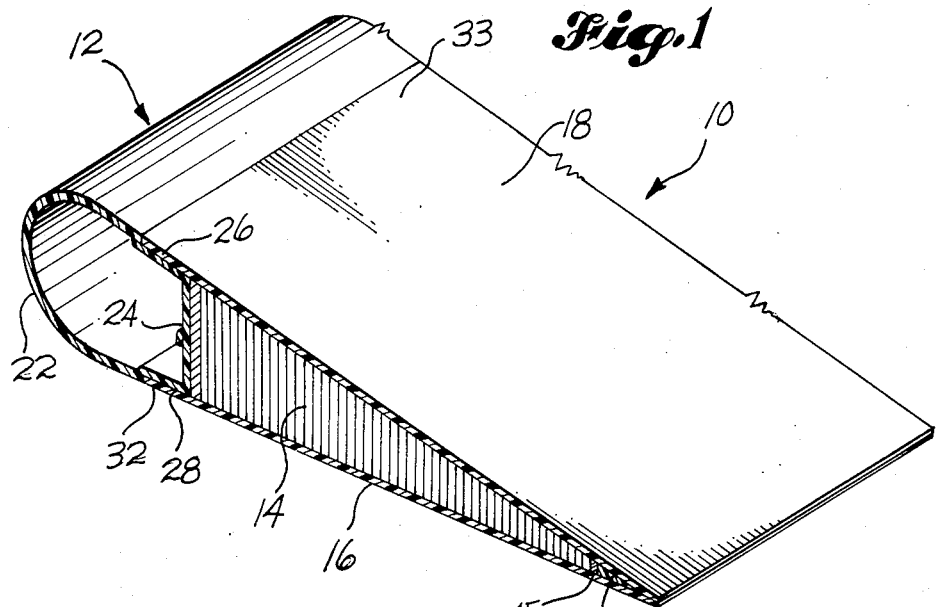
FIG. 1 is a fragmentary pictorial view of an aircraft control surface, with an end-wise portion of the surface being shown in section.

Referring now to the drawings, and first to FIG. 1, therein is shown an aircraft control surface 10. The control surface 10 may be an aircraft aileron, for example. Before the method of constructing such surface 10 is described, the basic components of which it is comprised will first be discussed.

In basic form, the control surface 10 includes a leading edge/spar member component 12 which, when the surface 10 is in use aboard an aircraft, is connected to a pivoting member for rotating the surface in an airstream. The leading edge/spar member 12 is of a one-piece construction which will be further described later. Connected to the leading edge/spar member 12 is a generally wedge-shaped honeycomb member 14 that provides the structural core of the control surface 10. A pair of first and second skin surface members 16, 18 are attached to each side of the honeycomb member 14, and to the leading edge/spar member 12. A wedge-shaped trailing edge member 20 is connected to the honeycomb member and provides trailing edge support for the skin surface members 16, 18. It is to be understood, of course, that only a portion of the control surface 10 is shown in FIG. 1. In actuality, the control surface 10 may be an elongated structure. For example, the distance from the forward end of the leading edge/spar member 12 to the wedge-shaped trailing edge member 20 could be on the order of less than one foot (30.5 centimeters), and the length of the surface 10 might extend for as much as five to ten feet (150–300 centimeters).

Figure 2:
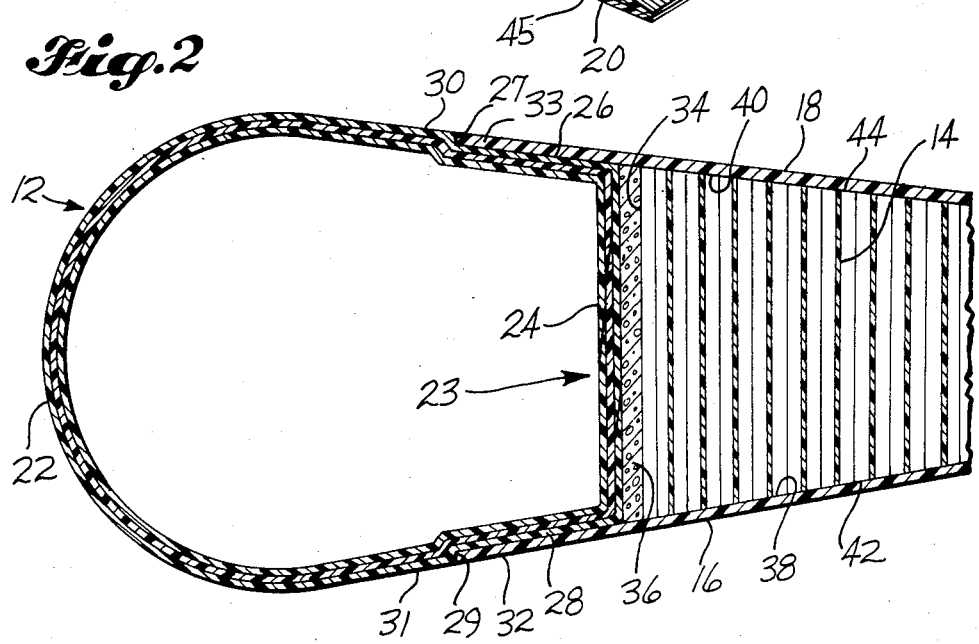
FIG. 2 is an enlarged fragmentary sectional view of the forward portion of the control surface of FIG. 1, and shows the forward leading edge/spar member of the control surface.

As is shown in FIGS. 1 and 2, the leading edge/spar member 12 has a rounded leading edge portion 22, and a spar portion (indicated generally by arrow 23) that includes a web portion 24 and a pair of first and second rebate portions 26, 28. The rebate portions 26, 28 connect the web portion 24 to the rounded leading edge portion 22, and provide "steps" 27, 29 in the upper and lower surfaces 30, 31 of the leading edge/spar member 12. The steps 27, 29 permit the leading sides or edges 32, 33 of the skin members 16, 18 to be joined or fayed to the leading edge/spar member 12 so that the leading edge/spar and skin members form a substantially smooth and continuous aerodynamic surface.

Figure 3:
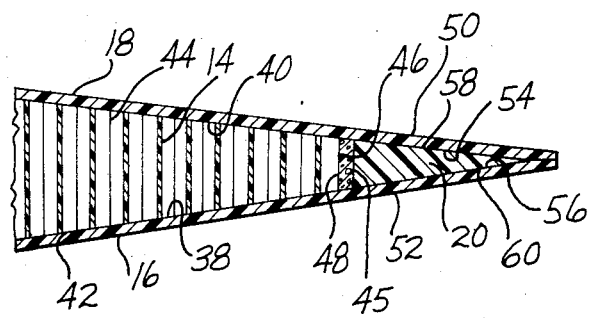
FIG. 3 is an enlarged fragmentary sectional view of the aft or trailing edge portion of the control surface of FIG. 1.

A forward end surface 34 of the honeycomb member 14 is connected to the web portion 24 of the leading edge/spar member 12 by a layer of foam adhesive material 36. As was mentioned above, the honeycomb member 14 provides the structural core and stiffening support for the control surface 10. Inner surfaces 38, 40 of the first and second skin surface members 16, 18, respectively, are attached to lower and upper sides 42, 44 of the honeycomb member 14. As can be seen in FIG. 3, an aft end 46 of the honeycomb member 14 is attached by another layer of foam adhesive material 45 to a forward surface 48 of the wedge-shaped trailing edge member 20. Trailing sides or edges 50, 52 of the upper and lower skin surfaces 18, 16 converge to a point and are supported by the trailing edge member 20. The inner surfaces 54, 56 of the trailing sides 50, 52 are attached to upper and lower outer surfaces 58, 60 of the trailing edge member 20. By way of example only, connections between the honeycomb member surfaces 42, 44, the upper and lower inner skin surfaces 40, 38, and the trailing edge member surfaces 58, 60 may all be made by using adhesive film bonding techniques. Similarly, the forward leading sides or ends 33, 32 of the upper and lower skin surface members 18, 16 may also be adhesively bonded to rebate portions 26, 28, respectively.

In preferred form, the leading edge/spar member 12 is to be constructed of a composite material such as graphite/epoxy. The upper and lower skin surface members 18, 16, and the trailing edge member 20 may all be constructed of graphite/epoxy as well. The honeycomb member 14 may be milled from a piece of Nomex (tradename) honeycomb into the wedge-shaped configuration shown in FIGS. 1, 2, 3 and 8.

The above-described components and material makeup of the control surface 10 would be well-known to a person skilled in the art. Such a person would be familiar with the general shape of the leading edge/spar member 12, the honeycomb member 14, the wedge-shaped trailing edge member 20, and the upper and lower skin surface members 18, 16. Such a person would also be familiar with the manner and method by which these components may be assembled together to form a control surface. Having thus generally described the basic components of the control surface 10, a method of constructing the one-piece leading edge/spar member 12 in accordance with the present invention will now be described.

Referring now to FIG. 4, therein is shown in cross-section a lay-up mandrel 62 for forming a composite material leading edge/spar member like that shown in FIGS. 1 and 2. The mandrel 62 includes a rounded leading edge forming portion 64, and a spar forming portion that is indicated generally by arrow 66. The spar forming portion 66 further includes a web forming portion 68, and first and second rebate forming portions 70 and 72. The rebate forming portions 70, 72 connect the web forming portion 68 to the rounded leading edge portion 64. They also provide "steps" 75,77 in each of the upper and lower surfaces 74, 76 of the mandrel. The mandrel 62 may be made of aluminum, for example. It is to be understood, of course, that the mandrel 62 shown in FIG. 4 is an elongated member. A cross-sectional view is the only view of the mandrel 62 provided herein. The mandrel 62 would normally be of a sufficient length to construct an elongated leading edge/spar member, which a person skilled in the art would realize.

To form a one-piece composite leading edge/spar member, the mandrel 62 may first be prepared by the application of a parting agent to its outer surfaces 64, 68, 70, 72, 74, 75, 76 and 77. A parting agent would prevent a composite material from adhering to the surface of the mandrel 62. The mandrel 62 may then be wrapped with a composite material 80. In FIG. 5, therein is shown the manner by which the mandrel 62 may be wrapped. A leading end portion 78 of the material or wrap 80 is first placed on the web forming portion 68 of the mandrel. By way of explanation, a flexible graphite/epoxy material that is suitable for use as a wrap will typically have sufficient tack so that it will stick to the web forming portion 68 during the wrapping process. There would be no need for the additional application of adhesive or bonding agents. After the leading end portion 78 is placed on the web forming portion 68, the material or wrap 80 is then wrapped around the rounded leading edge forming portion 64 of the mandrel 62 in the manner shown in FIG. 5. The wrapping process is finished by overlapping the leading end portion 78 with a trailing end portion 82, as shown by the dashed lines in FIG. 5. By way of nonlimitative example only, the trailing end portion 82 may overlap the leading end portion 78 by as much as 0.5 inches. The trailing end portion 82 should overlap the leading end portion 78 so that the trailing end portion is also adjacent the web forming portion 68. The tack of the wrap 80 would permit the trailing end 82 to stick to the leading end portion 78.

To form a one-piece leading edge/spar member, at least one layer of composite material must be wrapped around the mandrel 62. In preferred form, however, possibly three layers, each having a thickness of approximately 0.010 inches, may be used. The number of layers and their thicknesses will ultimately be a matter of engineering choice when taking into consideration the particular use for a control surface in which the leading edge/spar member is to be a component.

An advantage to practicing the method of the present invention is that if more than one layer of composite material is used to form the leading edge/spar member, then the material may be continuously wrapped around the mandrel without splices between the leading and trailing end portions of the material. This would provide a fast manufacturing process for mass producing large numbers of leading edge/spar members. Directing attention back to FIG. 2, the leading edge/spar member 12 shown in this Fig. is illustrative of a leading edge/spar member that was continuously hand wrapped in accordance with practicing the method of the present invention. However, the mandrels 62 shown in FIGS. 5–7 are wrapped with three individual layers 79, 81, 83 of composite material. Either method would be suitable to produce a one-piece leading edge/spar member.

It should be recognized that filament winding may be a possible method for use in mass producing large quantities of leading edge/spar members. By way of example only, a graphite/epoxy string could be filament wound around the mandrel 62 to form the ending edge/spar member 12. Such a string could, for example, have a thickness of 0.0045 inches, and a width of 0.125 inches.

After the mandrel 62 is wrapped, it is then positioned adjacent an elongated supporting surface 84, in the manner shown in FIG. 6, so that the wrapped web forming portion 85 of the mandrel is in abutting relationship with the supporting surface 84. A pair of first and second elongated caulplates 86, 88 are then applied to each of the wrapped rebate forming portions 90, 92. Still another elongated caulplate 94 is applied to the wrapped rounded leading edge forming portion 96. The caulplates 86, 88, 94, and the supporting surface 84, are shaped for molding the composite wrap 80 into the same shape as the mandrel 62. That is, the surface 84 is shaped for molding a web portion, the caulplates 86, 88 are shaped for molding rebate portions, and the caulplate 94 is shaped for molding the rounded leading edge portion of a leading edge/spar member. In preferred form, the caulplates 86, 88 and 94 are relatively thin members having thicknesses that are on the same order of magnitude as the thickness of the composite material 80. It is possible, for example, that the caulplate 94 covering the rounded portion 64 of the mandrel 62 may be constructed of a relatively flexible fiberglass material. After the caulplates 86, 88 and 94 have been applied to their respective portions of the mandrel 62, the entire assembly of caulplates and surface 84 is then in the condition shown in FIG. 7, and is ready for curing.

In actuality, the wrapped web forming portion 85 would abut the supporting surface 84 in substantially flush relationship. This is because the thickness of each layer of composite material is relatively small in relation to the size of the mandrel. In FIGS. 6 and 7 the layers 79, 81, and 83 are drawn in disproportionate scale for the purpose of better illustrating material overlaps in the web portion.

Curing the composite material 80 is a process that would be well-known to a person skilled in the art. To cure the composite material 80, the above-described assembly, i.e., the wrapped mandrel 62, caulplates 86, 88, 94 and elongated supporting surface 84, may first be vacuum bagged and placed in an autoclave. Once in the autoclave, the vacuum bagged assembly may be subjected to a certain pressure and temperature. Pressure in the autoclave would force the bagging against the caulplates 86, 88, 94 and surface 84 (in addition to the force resulting from evacuation associated with vacuum bagging), which in turn would cause the caulplates and surface to mold the material 80 into the shape of the mandrel 62.

Placement of the assembly into an autoclave is indicated schematically by the dashed lines 100 in FIG. 7. The vacuum bagging part of the curing process is not shown in this Fig., however. Pressure in the autoclave acting on the caulplates 86, 88, 94, and the supporting surface 84, to mold the material 80 is indicated generally by arrows 98. By way of example only, the assembly may be subjected to a pressure of approximately 85.0 psi, and heated to a temperature of approximately 350°

F. This temperature and pressure may be held for approximately 1.5 hours to properly cure the composite material 80.

It should be noted that it may be possible to cure the composite material 80 by applying pressure to the material solely through the use of a vacuum bagging process. This would eliminate the use of the caulplates 86, 88, 94 and the supporting surface 84. For example, the wrapped mandrel 64 could be vacuum bagged and placed in an autoclave minus some or all of such caulplates and surface. Pressure in the autoclave could then be used to force the bagging against the composite material in a manner such that the bagging by itself could sufficiently mold the composite material into the shape of the mandrel.

It is well-known that composite materials such as graphite/epoxy, for example, are very stable from a thermal standpoint, i.e., such materials do not expand or contract a great amount as a result of variations in their temperature. During the curing process, heating the assembly of wrapped mandrel, caulplates, and supporting surface causes the mandrel 62, which can be made of aluminum, to thermally expand thereby further forcing the composite material 80 against the caulplates 86, 88, 94 and surface 84. The material is thus cured while the mandrel 62 remains in such thermally expanded state. When the curing process is finished, and when the assembly is removed from the autoclave, the mandrel contracts as it cools to a lower temperature. The composite material 80 will remain in the shape of the thermally expanded mandrel since the material 80 will not contract as the mandrel cools. What this means is that the mandrel shrinks relative to the composite material, thereby permitting easy removal of the mandrel from the newly formed leading edge/spar member once the curing process and/or control surface assembly process is completed.

Referring now to FIG. 8, the assembly of the components of the control surface 10 shown in FIGS. 1 and 2 will now be described. Like reference numerals refer to like parts throughout FIGS. 1, 2, 3 and 8. As was suggested above, once the leading edge/spar member 12 has been formed, it may remain wrapped around the mandrel 62 until the control surface is completely assembled. What this means is that the mandrel 62 can provide a dual function, i.e., not only can it be used to form the leading edge/spar member, but it can also serve as an assembly jig for the control surface 10. Therefore, after the leading edge/spar member 12 is formed, the mandrel and leading edge/spar member may be repositioned away from the surface 84. Then, the two caulplates 86, 88 applied to the rebate portions 90, 92 may be removed from the rebate portions 90, 92, after which the rest of the control surface components may be attached to the leading edge/spar member 12.

To assemble the control surface 10, one of the leading sides or edges 32, 33 of the skin surface members 16, 18 is attached to one of the rebate portions 26, 28 of the leading edge/spar member. Then, the trailing edge member 20 will be attached to the trailing end of that particular skin surface member. The trailing edge member 20 will be indexed a sufficient distance from the web portion 24 of the leading edge/spar member 12 so that the pre-milled honeycomb member 14 will snugly fit between the web portion and the trailing edge member 20. The other skin surface member may then be attached to the leading edge/spar member 12, honeycomb member 14, and trailing edge member 20 in the same manner as the first skin member.

As was mentioned above, and as is shown in FIG. 8, a layer of foam adhesive 36 may be used to bond the honeycomb member 14 to the web portion 24. Another layer of foam adhesive 45 may be used to bond the honeycomb member 14 to the trailing wedge member 20. Attachment of the other components of the control surface 10 may be made by filmed adhesive bonding, for example. However, such films are not shown in FIG. 8. Once the control surface has been assembled, it may then be subjected to still another vacuum curing process in a manner similar to that which was described above. It may not, however, be necessary to apply additional external pressure to the bagging. This would be a matter of engineering choice. Such a process could therefor include first vacuum bagging and then placing the control surface in an unpressurized oven. Once in the oven, the surface may be heated to a temperature of approximately 350° F., and held at that temperature for approximately 1.5 hours. It is also possible that pressure plates may be attached to the outer surfaces of the skin members 16, 18 during the vacuum curing process. Such plates are not shown in the drawings, however.

The above description was provided solely for presenting the Best Mode For Carrying Out The Invention. This description is not to be construed in the sense of limiting the scope or practice of the invention. It is to be understood that the scope of the invention is to be limited only by interpretation of the appended claims which follow, such interpretation being made in accordance with the standard rules of patent claim interpretation.

What is claimed is:

1. A method of fabricating an aircraft control surface, or the like, the method comprising the following steps:
   (a) Providing a mandrel shaped to have a rounded leading edge forming portion and a spar forming portion, said spar forming portion including first and second rebate forming portions each of which is connected to said rounded leading edge portion, said spar forming portion further including a web forming portion which interconnects said first and second rebate forming portions;
   (b) applying a composite material to said mandrel, with said material perimetrically surrounding and covering said rounded leading edge portion and said spar forming portion;
   (c) positioning said covered mandrel in abutting relationship adjacent a supporting surface, so that the covered web forming portion of said spar forming portion abuts said surface, and positioning a separate caulplate against each of the covered rebate forming portions of said spar forming portion, and positioning still another caulplate against the covered rounded leading edge forming portion of said mandrel, wherein said caulplates and said supporting surface cooperate with each other to substantially surround said covered mandrel;
   (d) curing said composite material to set in the shape of said mandrel, to form a one-piece leading edge/spar member, including applying forming pressure to said caulplates and to said supporting surface in a manner so as to force said caul plates and said supporting surface against said composite material, and including heating and thermally expanding said mandrel at the same time said forming pressure is applied, such expansion forcing said composite material outwardly and against said caulplates and said supporting surface, wherein said forming pressure applied to said caulplates and to said supporting surface together with said thermal expansion shape and mold said material into the same shape as said mandrel;

(e) after forming said one-piece leading edge/spar member, attaching a leading side of a first skin member to one of the formed rebate portions of said leading edge/spar member, in a manner so that the formed rounded leading edge portion of said leading edge/spar member and said first skin surface member form a substantially continuous aerodynamic surface;

(f) attaching a generally wedge-shaped trailing edge member to a trailing side of said first skin surface member;

(g) attaching a generally wedge-shaped honeycomb core member to said leading edge/spar member, and to said first skin surface member, and to said trailing edge member, wherein said honeycomb member includes a forward end surface connected to the web portion of said leading edge/spar member, and an aft end surface connected to said trailing edge member, and upper and lower honeycomb side surfaces, wherein one of said side honeycomb surfaces is connected to said first skin surface member;

(h) attaching a leading side of a second skin surface member to the other of said rebate portions of said leading edge/spar member, in a manner so that said rounded leading edge portion of said leading edge/spar member and said second surface member form a substantially continuous aerodynamic surface, and attaching said second skin surface member to the other of said honeycomb side surfaces, and to said trailing edge member, and wherein said leading edge/spar member, said honeycomb member, said trailing edge member, and said first and second skin surface members together form said control surface; and (i) curing said control surface.

2. The method according to claim 1, wherein
curing said composite material in step (d) includes causing said caulplates and said supporting surface to be forced against said composite material such that they apply a pressure of approximately 85 psi against said material, and heating said composite material, said mandrel, said caulplates, and said supporting surface to a temperature of approximately 350° F., and maintaining such pressure and temperature for approximately 1.5 hours.

3. The method according to claim 1 in which:
applying a composite material to said mandrel in step (b) includes wrapping said mandrel, wherein the wrapping is started by placing a leading end portion of a composite material wrap on said web forming portion of said mandrel, and then wrapping at least one layer of said wrap around said mandrel, and wherein the wrapping is finished by overlapping said leading end portion with a trailing end portion of said wrap, with said trailing end portion also being adjacent said web forming portion.

4. The method according to claim 1 in which:
applying a composite material to said mandrel in step (b) includes filament winding said material around said mandrel.

* * * * *